April 23, 1963 G. R. DRENGLER ETAL 3,087,003
HIGH RATE PRIMARY BATTERIES
Filed June 16, 1959 2 Sheets-Sheet 1

INVENTORS
GEORGE R. DRENGLER
MILTON B. CLARK
ROBERT E. STARK
THEODORE R. BEATTY
BY John F. Hohmann
ATTORNEY

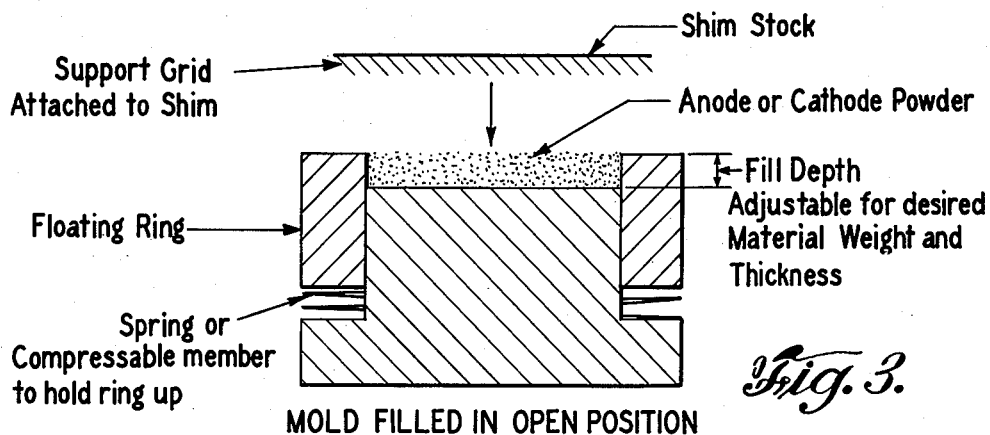
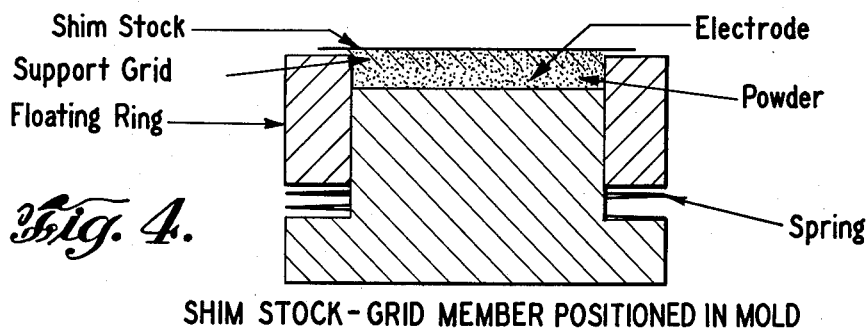
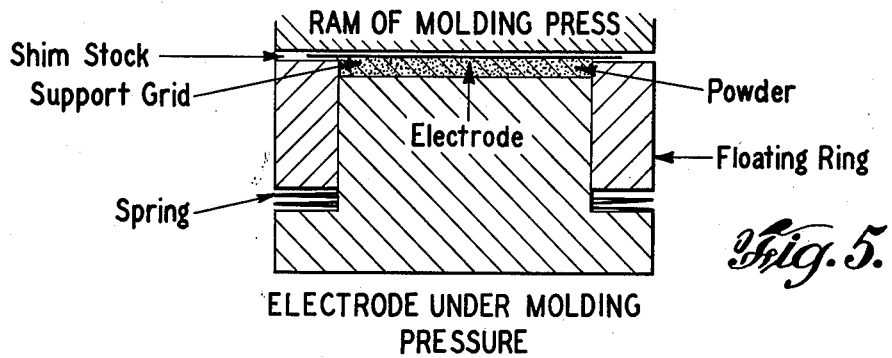

United States Patent Office 3,087,003
Patented Apr. 23, 1963

3,087,003
HIGH RATE PRIMARY BATTERIES
George R. Drengler, North Olmsted, Milton B. Clark, North Royalton, and Robert E. Stark, Cleveland, Ohio, and Theodore R. Beatty, Bennington, Vt., assignors to Union Carbide Corporation, a corporation of New York
Filed June 16, 1959, Ser. No. 820,723
3 Claims. (Cl. 136—10)

This invention is concerned with high rate primary batteries, and to methods for producing the same.

New applications demand efficient energy withdrawal from batteries in periods of one to ten minutes in contrast to conventional primary battery uses in which the life is measured in days, weeks or months. Equally important, the weight and volume allotment given in these inventions to any component is held within restrictive limits. Thus, electrochemical systems capable of delivering power at high rates are often unusable because of poor energy to weight or volume factors. Miniaturization of electronic gear utilized in these applications have made possible substantial increases in pay load. Still, the primary battery remains the only reliable power source for these applications. Therefore, a continuing effort toward improving the volumetric and gravimetric efficiency of high rate primary batteries is being made by battery manufacturers.

The construction practiced by high rate primary battery manufacturers is analogous to that seen in conventional storage batteries. The battery consists of a number of individual cell compartments contained in a one-piece plastic case. Positioned in each cell compartment are an appropriate number of anode and cathode plates together with electrode separators, the total of which is dependent upon desired current output. In the unit cell all anode plates are connected to a common lead wire, and similarly all cathode plates. Upon electrolyte addition, all the plates in one compartment are immersed in a common solution reservoir. To provide desired battery voltage, these individual multi-plate cells are wired in series. This construction method necessitates each electrode be affixed to a current collector of sufficient mass to conduct the current generated to the terminals without significant energy dissipation through heat ($I^2R$) losses. This collector is commonly a silver plated copper screen, 40 x 40 mesh—.014 inch thick, in applications where the electrode current density is 1.0–1.5 amperes per square inch (5–10 minute battery). The collector in this case represents 35 to 40 percent of the total electrode weight and volume. Thus the coulombic capacity per unit weight and volume of the electrodes is at best 60 percent of that obtainable were all the mass active material. This value is further reduced by the necessity of a multi-compartment case, which adds significant volume and weight to the packaged battery.

The silver oxide-zinc couple in potassium hydroxide electrolyte is presently the system most widely accepted for high rate primary batteries. Commercially the electrodes are electro-formed by multiple charging and discharging of porous silver plates (cathodes) and zinc oxide plates (anodes). This process is slow and costly.

The main object of the present invention is to provide novel duplex electrodes capable of permitting substantial reductions in the mass of structural members required for high rate primary batteries.

Another object of the present invention is to provide means for improving the gravimetric and volumetric efficiency of high rate primary batteries.

In the drawings:

FIG. 3 is a cross-sectional view of a mold used in making the electrodes of the invention;

FIG. 4 is the same as FIG. 3, but shows the shim stock grid member positioned on the mold; and FIG. 5 shows the electrode in the mold under molding pressure.

The electrodes of the invention are formed by compression molding electrochemically-active materials through lightweight, expanded metal grids, and against each face of a thin impervious electronically-conductive, electrochemically-inert cell separator member.

Figure 2:
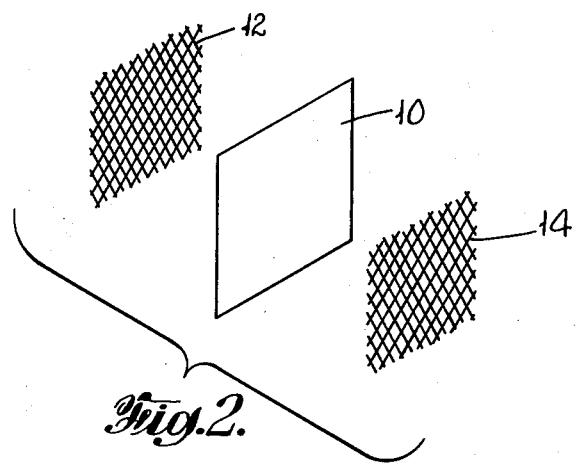
FIG. 2 is an exploded view of an electrode in accord with the invention.

Essentially, and as shown on FIG. 2, the duplex electrode of the invention consists of an electronically-conductive, electrochemically-inert cell separator member 10 (.001 inch to .003 inch thick steel shim stock, preferably silver plated). A lightweight expanded metal grid 12 serves to hold the active material onto this shim. The grid can consist of 2/0, 13 mesh, .005 inch thick stock, expanded 10–10 steel, also preferably silver plated.

The duplex electrode of the invention is fabricated as follows:

A grid of silver-plated expanded metal is spot welded to one face of a silver-plated shim stock. The shim stock is made slightly larger in area than the expanded metal to prevent inter-electrode communication. Then divalent silver oxide powder or another oxide depolarizer is compressed through the grid onto the shim at pressures of 5 to 10 tons per square inch. The molding operations for the duplex electrode are illustrated sequentially in FIGS. 3 through 5. As shown on FIG. 3, anode or cathode powders are placed in a mold to a fill depth adjustable for desired material weight and thickness. Next, in FIG. 4, the shim-supported grid is placed over the powder, and in FIG. 5 the ram of the molding press is forced against the assembly. A second expanded metal grid then is spot welded to the opposite face of the shim stock, and the other active material is compressed into it, as previously discussed, but this time at a lower pressure ranging from 0.5 to one ton per square inch.

After molding, the finished electrode consists of one anode face 12 (e.g. zinc) and one cathode face 14 (e.g., silver oxide or other oxide depolarizers) supported by an electronically conductive member (shim stock). The grids are visible through the active materials.

To construct a 28 volt unit with silver oxide cathodes and zinc anodes, 18 or 19 of these parts are stacked (with proper regard to polarity), one on top of the other with a suitably sorptive electrode separator 16 (nylon, viscon-vinyon, etc.) between active faces as shown in FIG. 2. The end electrodes in each stack have only one active face with the shim stock serving as a terminal connector.

The grid member in this construction weighs only .15 to .17 gm./in.$^2$, as compared to 0.50 to 0.55 gm./in.$^2$ in the previously discussed commercial battery. The duplex construction eliminates the need for a massive conductor, inasmuch as the current path is through the thickness of the stack, and not along the length of the electrodes. This means that in this construction the current path through one electrode is only .010 inch to .015 inch as compared to 1.5 to 2.0 inches in the commercial unit.

The gravimetric efficiency of the commercial high rate primary silver cell, exclusive of case and terminals, is 30 to 35 watt hours per pound. It is noteworthy to remark then that a six cell high rate primary silver cell constructed with the duplex electrodes of the invention provides weight efficiency of 60 to 65 watt hours/pound (exclusive of case and terminals). Equally significant, the volumetric efficiency of the duplex construction is nearly 2.5 times that of prior art commercial units (exclusive of case and terminals in each case).

It should be noted that unlike many previously patented duplex electrodes, those herein do not require the use of any organic or inorganic binders to achieve adherence of active particles to grid elements. Further prior art employment of grids has been limited to thick grids.

Figure 1:
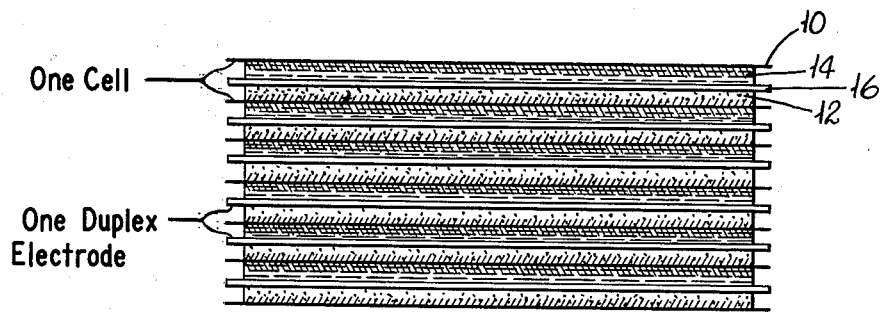
FIG. 1 is a series stack arrangement of cells employing the electrodes of the invention.

The duplex electrodes of the invention are particularly suitable for use in reserve-type batteries. In such batteries, a number of electrodes such as depicted on FIG. 1 and on FIG. 2 are positioned in suitable cell containers. Sufficient electrolyte to saturate the electrodes and the bibulous electrode separators is supplied when electricity is desired. It should be pointed out that the use of an amount of electrolye greatly in excess of that required to saturate the cell elements, such as would occur were the stack to be immersed in electrolyte, would cause inter-cell shorting, and significantly reduce the electrical output. In actual practice the controlled required amount of electrolyte is poured, or otherwise directed, into the stack structure from one or more sides of the stack. The absorption capacity of the separators and electrodes readily removes any accumulation of electrolyte on the exterior of the stack, and thus prevents inter-cell shorting.

The chemically-active particles which may be used in the making of the present duplex electrodes include a large variety of electro-negative and electro-positive reactive materials. Such materials are employed in electrical couples consisting of a metal such as zinc, cadmium, magnesium, lead, iron or aluminum, and an oxide such as silver oxide, mercuric oxide, vanadium pentoxide, manganese dioxide, etc. The amount thereof is commensurate with the thickness desired, and the required performance. For a duplex electrode measuring 3 inches by 3.5 inches, the amount of active material on each side can be suitably about 18 grams.

The present duplex electrodes can be employed in cells using a variety of electrolytes. Of these, potassium hydroxide solution containing from 31.5 to 33 percent KOH is preferred.

What is claimed is:

1. A method of fabricating duplex electrodes for use in primary batteries, comprising securing a thin expanded metallic grid to one face of an electronically-conductive, electrochemically inert metallic separator of a size slightly larger than said thin expanded metallic grid, compressing through and onto said grid and said face of said separator at a high pressure an electropositive oxide material selected from the group consisting of silver oxide, mercuric oxide, vanadium pentoxide and manganese dioxide, securing another expanded metallic grid onto the opposite face of said separator, and compressing through and onto said second grid and said opposite face of said separator an electronegative material selected from the group consisting of zinc, cadmium, magnesium, lead, iron and aluminum, but at a substantially lower pressure than in the compression of said electropositive oxide material.

2. The method of claim 1 wherein said first pressure is 5 to 10 tons per square inch and said second pressure is 0.5 to 1 ton per square inch.

3. A method of fabricating duplex electrodes for use in primary batteries, comprising securing a thin expanded metallic grid to one face of an electronically-conductive, electrochemically inert metallic separator of a size slightly larger than said thin expanded metallic grid, compressing through and onto said grid and said face of said separator at a high pressure an electropositive oxide material, securing another expanded metallic grid onto the opposite face of said separator, and compressing through and onto said second grid and said opposite face of said separator an electronegative material, but at a substantially lower pressure than in the compression of said electropositive oxide material.

References Cited in the file of this patent

UNITED STATES PATENTS

| | | |
|---|---|---|
| 2,571,616 | Ruben | Oct. 16, 1951 |
| 2,575,337 | Ellis | Nov. 20, 1951 |
| 2,580,415 | Ellis | Jan. 1, 1952 |
| 2,620,369 | Daniel | Dec. 2, 1952 |
| 2,684,989 | Wilburn | July 27, 1954 |

FOREIGN PATENTS

| | | |
|---|---|---|
| 17,758 | Great Britain | Oct. 17, 1891 |